United States Patent
Thompson

[11] Patent Number: 6,024,870
[45] Date of Patent: Feb. 15, 2000

[54] SEWAGE FILTRATION SYSTEM

[76] Inventor: Eugene R. Thompson, 2703 50th Ave., Lone Rock, Iowa 50559

[21] Appl. No.: 09/219,262

[22] Filed: Dec. 22, 1998

Related U.S. Application Data

[63] Continuation-in-part of application No. 08/987,681, Dec. 9, 1997.

[51] Int. Cl.[7] ............................. B01D 24/14; B01D 29/05
[52] U.S. Cl. ..................... 210/151; 210/255; 210/262; 210/265; 210/266; 210/283; 210/291; 210/317; 210/336; 210/532.2
[58] Field of Search ..................... 210/150, 151, 210/255, 261, 262, 266, 269, 314, 317, 336, 532.2, 615, 617, 618, 620, 631, 791, 792, 806, 807, 283, 284, 291, 265

[56] References Cited

U.S. PATENT DOCUMENTS

| | | | |
|---|---|---|---|
| 699,345 | 5/1902 | Provost, Jr. | 210/151 |
| 853,217 | 5/1907 | Bordigoni | 210/150 |
| 2,014,431 | 9/1935 | Foster | 210/150 |
| 2,087,442 | 7/1937 | Nack | 210/283 |
| 2,158,169 | 5/1939 | Wright | 210/255 |
| 2,463,464 | 3/1949 | Lind | 210/150 |
| 2,956,682 | 10/1960 | Stephan | 210/291 |
| 3,292,788 | 12/1966 | Schwarz | 210/291 |
| 3,732,160 | 5/1973 | Klock | 210/150 |
| 4,093,546 | 6/1978 | Taborsky | 210/255 |
| 4,427,548 | 1/1984 | Quick, Jr. | 210/150 |
| 4,659,485 | 4/1987 | Arbisi et al. | 210/255 |
| 5,084,164 | 1/1992 | Del Rosario | 210/151 |
| 5,232,585 | 8/1993 | Kanow | 210/151 |
| 5,453,182 | 9/1995 | Kikuta | 210/151 |
| 5,693,220 | 12/1997 | Sceusa | 210/283 |

Primary Examiner—Christopher Upton

[57] ABSTRACT

A sewage filtration system for efficiently filtering sewage waste material from smaller residential areas without the use of expensive sewage treatment plants. The inventive device includes a conventional septic tank connected to each building structure's sewage system, a pair of fluidly connected two compartment tanks connected to the conventional septic tanks, and a final phase filtering tank fluidly connected to the pair of two compartment tanks. The final phase filtering tank comprises a tank, a cover, an inlet tube, an outlet tube, a first tube connected to the outlet tube, a second tube fluidly connected to the first tube wherein the second tube is water permeable, at least one sand or gravel layer above the second tube, a layered filter structure above the sand or gravel layer that receives the filtered liquid from the inlet tube. A half plug with drain apertures within the lower portion thereof is preferably utilized upon the inlet tube to slow the disbursement of the filtered liquid upon the layered filter structure. The layered filter and the first tube provide increased aeration of the filtered liquid. A chlorination line may be connected to the first tube to chlorinate the filtered liquid prior to leaving the outlet line. The purified liquid that is emitted from the outlet tube may be dispersed into the soil surrounding the final phase filtering tank because of the high filtering process without fear of contaminating the ground water or surrounding land.

16 Claims, 5 Drawing Sheets

SEWAGE FILTRATION SYSTEM

CROSS-REFERENCE TO RELATED U.S. PATENT APPLICATION

I hereby claim benefit under Title 35, United States Code, Section 120 of U.S. patent application Ser. No. 08/987,681 filed Dec. 9, 1997. This application is a continuation-in-part of the Ser. No. 08/987,681 application. The Ser. No. 08/987,681 application is currently pending.

BACKGROUND OF THE INVENTION

1. Field of the Invention

The present invention relates generally to sewage filter devices and more specifically it relates to a sewage filtration system for efficiently filtering sewage waste material from smaller residential areas without the use of expensive sewage treatment plants.

Rural communities and small towns across the United States are slowly dwindling in population. Their local government funds for improving the local infrastructure is also shrinking do to industry loss and migration of residents. However, many of the septic systems and sewage treatment plants for these rural communities and small towns are aging fast and generally need to be replaced. Because the cost of even a modest sewage treatment plant is in the millions of dollars, there is a need for an affordable, quality sewage treatment system for these communities.

2. Description of the Prior Art

Sewage treatment plants and systems have been in use for years. Typically, a rural community will have a common sewer pipe system that collects all of the sewage from the community. This sewage is then delivered to a sewage treatment plant and/or a sewage pond for filtering the sewage material. These convention sewage treatment systems work well to purify the sewage material, however they are not cost effective for a small community to rebuild in today's rural economic climate. Conventional quality sewage systems are sometimes out of the price range of a small community and hence the community will tend to repair an irreparable old system they currently are using to defer paying millions of dollars. This harms the environment around the community because of the inefficient filtration of the sewage material thereby leading to long-term contamination of ground water supplies and land.

While these devices may be suitable for the particular purpose to which they address, they are not as suitable for efficiently filtering sewage waste material from smaller residential areas without the use of expensive sewage treatment plants.

In these respects, the sewage filtration system according to the present invention substantially departs from the conventional concepts and designs of the prior art, and in so doing provides an apparatus primarily developed for the purpose of efficiently filtering sewage waste material from smaller residential areas without the use of expensive sewage treatment plants.

SUMMARY OF THE INVENTION

In view of the foregoing disadvantages inherent in the known types of sewage plants now present in the prior art, the present invention provides a new sewage filtration system construction wherein the same can be utilized for efficiently filtering sewage waste material from smaller residential areas without the use of expensive sewage treatment plants.

The general purpose of the present invention, which will be described subsequently in greater detail, is to provide a new sewage filtration system that has many of the advantages of the sewage plants mentioned heretofore and many novel features that result in a new sewage filtration system which is not anticipated, rendered obvious, suggested, or even implied by any of the prior art sewage plants, either alone or in any combination thereof.

To attain this, the present invention generally comprises a conventional septic tank connected to each building structure's sewage system, a pair of fluidly connected two compartment tanks connected to the conventional septic tanks, and a final phase filtering tank fluidly connected to the pair of two compartment tanks. The final phase filtering tank comprises a tank, a cover, an inlet tube, an outlet tube, a first tube connected to the outlet tube, a second tube fluidly connected to the first tube wherein the second tube is water permeable, at least one sand or gravel layer above the second tube, a layered filter structure above the sand or gravel layer that receives the filtered liquid from the inlet tube. A half plug with drain apertures within the lower portion thereof is preferably utilized upon the inlet tube to slow the disbursement of the filtered liquid upon the layered filter structure. The layered filter and the first tube provide increased aeration of the filtered liquid. A chlorination line may be connected to the first tube to chlorinate the filtered liquid prior to leaving the outlet line. The purified liquid that is emitted from the outlet tube may be dispersed into the soil surrounding the final phase filtering tank because of the high filtering process without fear of contaminating the ground water or surrounding land.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a sewage filtration system that will overcome the shortcomings of the prior art devices.

Another object is to provide a sewage filtration system that is affordable for smaller communities.

An additional object is to provide a sewage filtration system that improves the filtration of sewage material.

A further object is to provide a sewage filtration system that includes removable filters to enhance aeration of the filtered sewage.

Another object is to provide a sewage filtration system that is of a simple construction to build.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
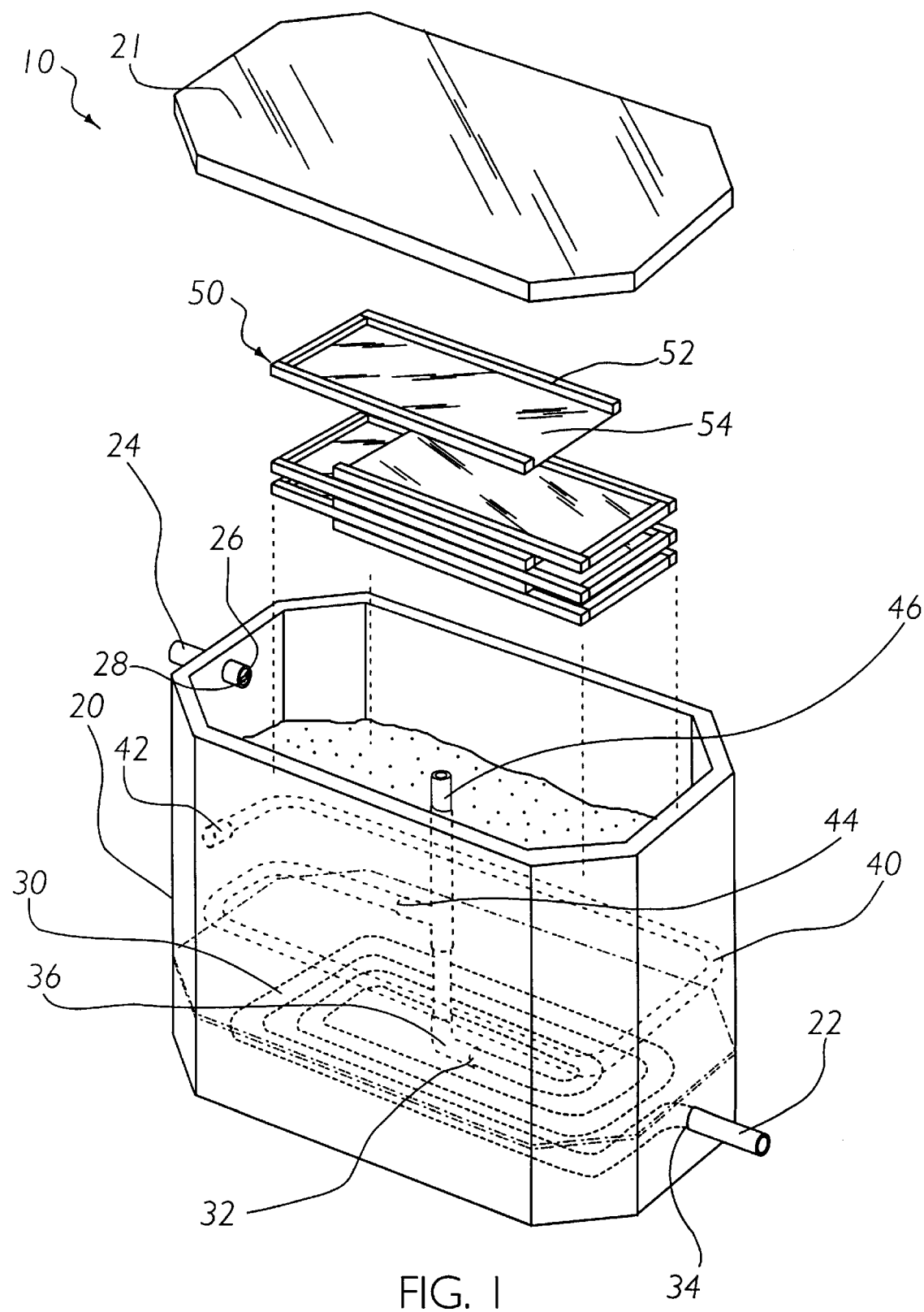
FIG. 1 is an upper perspective view of the present invention with the layered filter structure removed.

Turning now descriptively to the drawings, in which similar reference characters denote similar elements throughout the several view, FIGS. 1 through 5 illustrate a sewage filtration system 10, which comprises a conventional septic tank connected to each building structure's sewage system, a pair of fluidly connected two compartment tanks connected to the conventional septic tanks, and a final phase filtering tank 20 fluidly connected to the pair of two compartment tanks. The final phase filtering tank 20 comprises a tank 20, a cover 21, an inlet tube 24, an outlet tube 22, a first tube 30 connected to the outlet tube 22, a second tube 40 fluidly connected to the first tube 30 wherein the second tube 40 is water permeable, at least one sand or gravel layer above the second tube 40, a layered filter structure 50 above the sand or gravel layer that receives the filtered liquid from the inlet tube 24. A half plug 26 with drain apertures 28 within the lower portion thereof is preferably utilized upon the inlet tube 24 to slow the disbursement of the filtered liquid upon the layered filter structure 50. The layered filter structure 50 and the first tube 30 provide increased aeration of the filtered liquid. A chlorination line may be connected to the first tube 30 to chlorinate the filtered liquid prior to leaving the outlet line. The purified liquid that is emitted from the outlet tube 22 may be dispersed into the soil surrounding the final phase filtering tank 20 because of the high filtering process without fear of contaminating the ground water or surrounding land.

Figure 5:
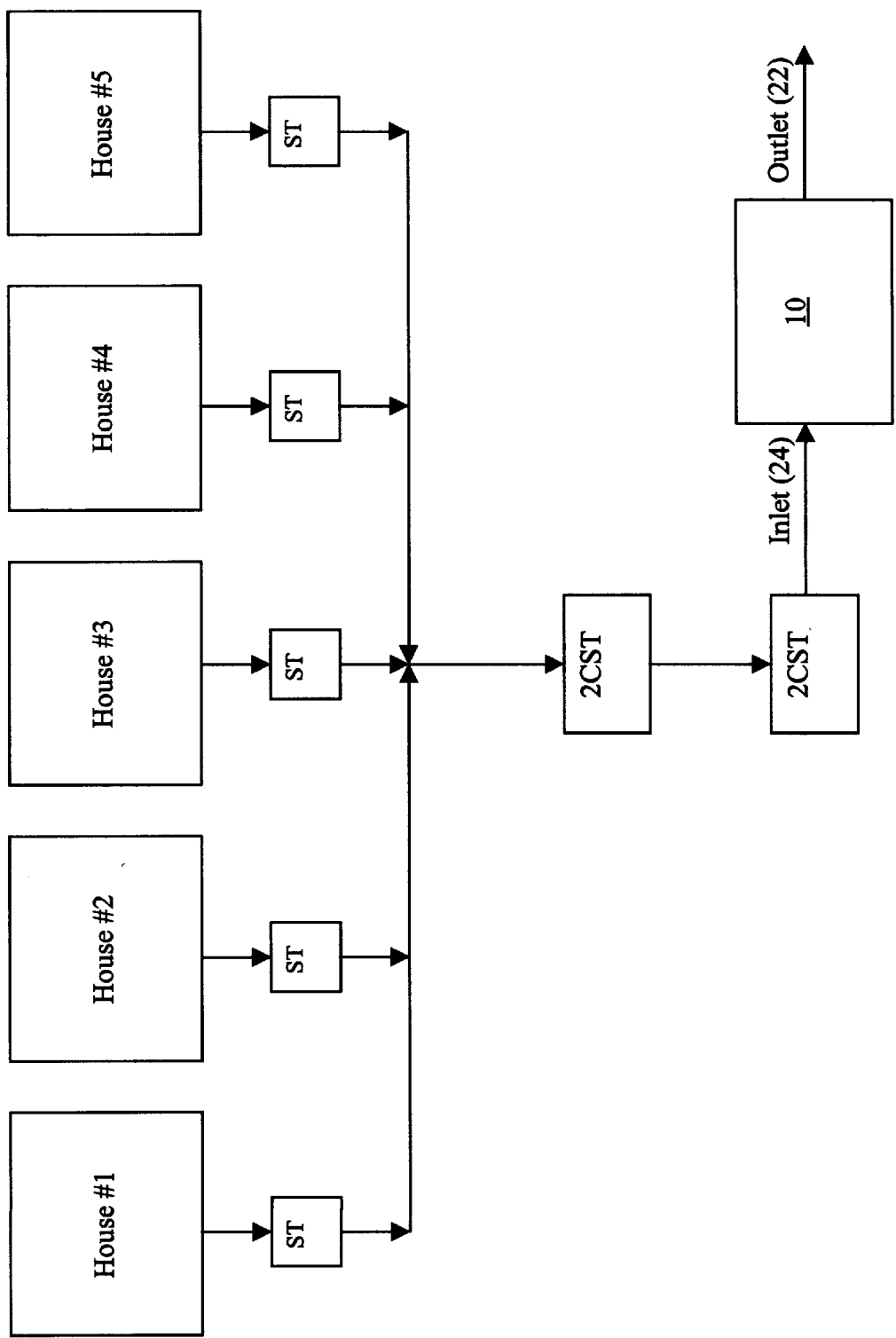
FIG. 5 is a box illustration of the present invention in use within a small community.

As shown in FIG. 5, the present invention is preferably utilized within a small community or rural development area. Each house (#1–#5) would have its own conventional septic tank as clearly shown in FIG. 5. All of the conventional septic tanks would drain into a first two-compartment septic tank through a sewage pipe system. If desired, a second two-compartment septic tank can be connected to the first two-compartment septic tank to provide increased aeration of the sewage material to increase the decomposition of the sewage material through aerobic action. By the time he sewage material exits the second two-compartment septic tank there is very little solid particles remaining.

Figure 4:
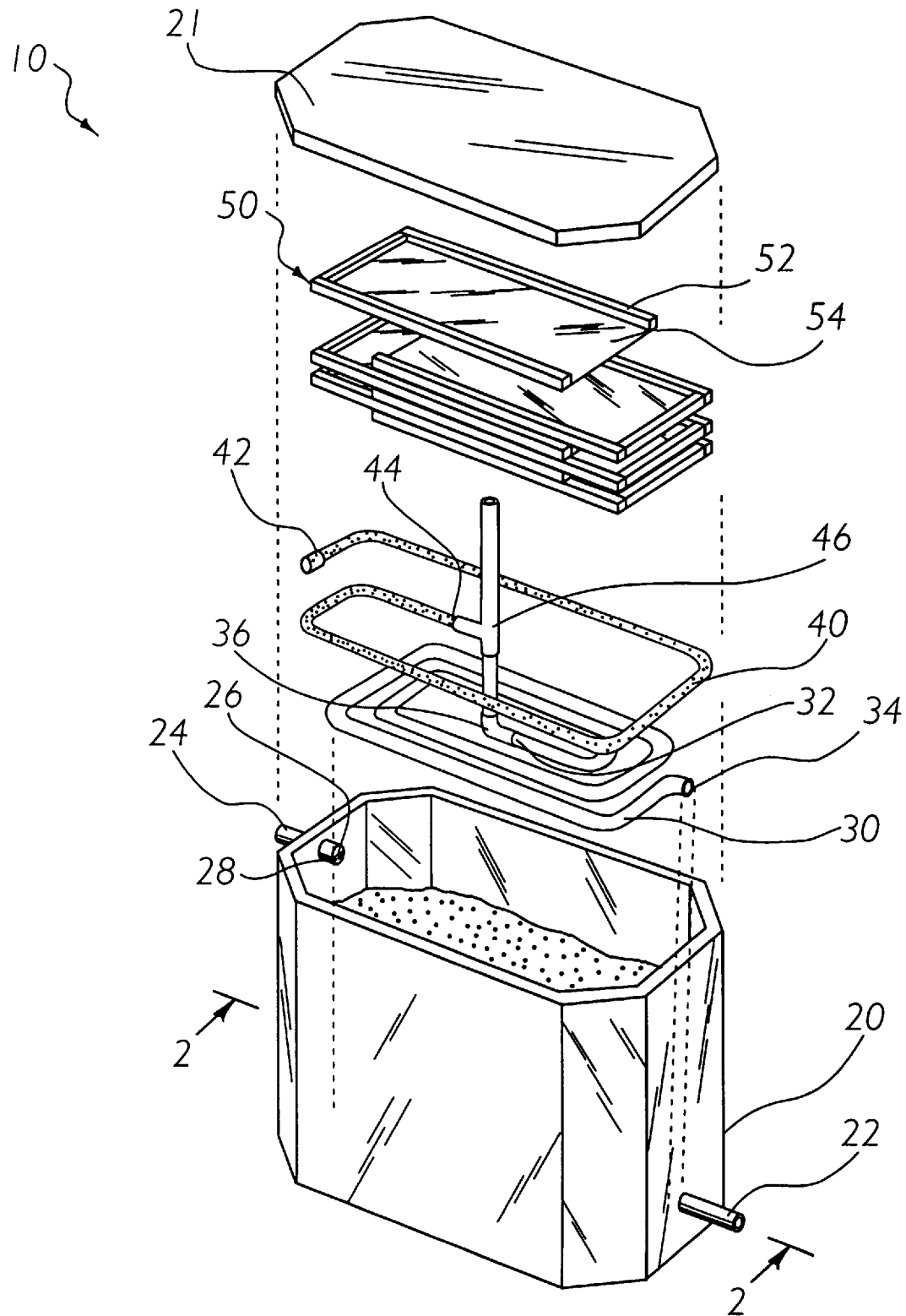
FIG. 4 is an exploded upper perspective view of the present invention.

As best shown in FIGS. 1 and 4, the tank 20 preferably has a generally rectangular shape, however it can be appreciated that the tank 20 may comprise any well-known shape or size. The tank 20 has a plurality of walls and a floor as best shown in FIGS. 1 and 4 of the drawings that are impermeable to water. A cover 21 is removably attachable to the tank 20 by conventional fastening means for selectively enclosing the tank 20. The removable cover 21 allows an individual to access the filtering system within the tank 20. An inlet tube 24 extends through an upper portion of the tank 20 and is connectable to the second two-compartment septic tank for receiving the liquefied sewage material.

As shown in FIG. 1, a plug 26 preferably partially encloses a lower portion of the inlet tube 24. At least one drain aperture is provided within the lower portion of the plug 26 for slowly allowing the disbursement of the liquefied sewage material into the tank 20. A larger opening remains in the upper portion of the plug 26 in situations of high flowage of liquefied sewage.

Figure 2:
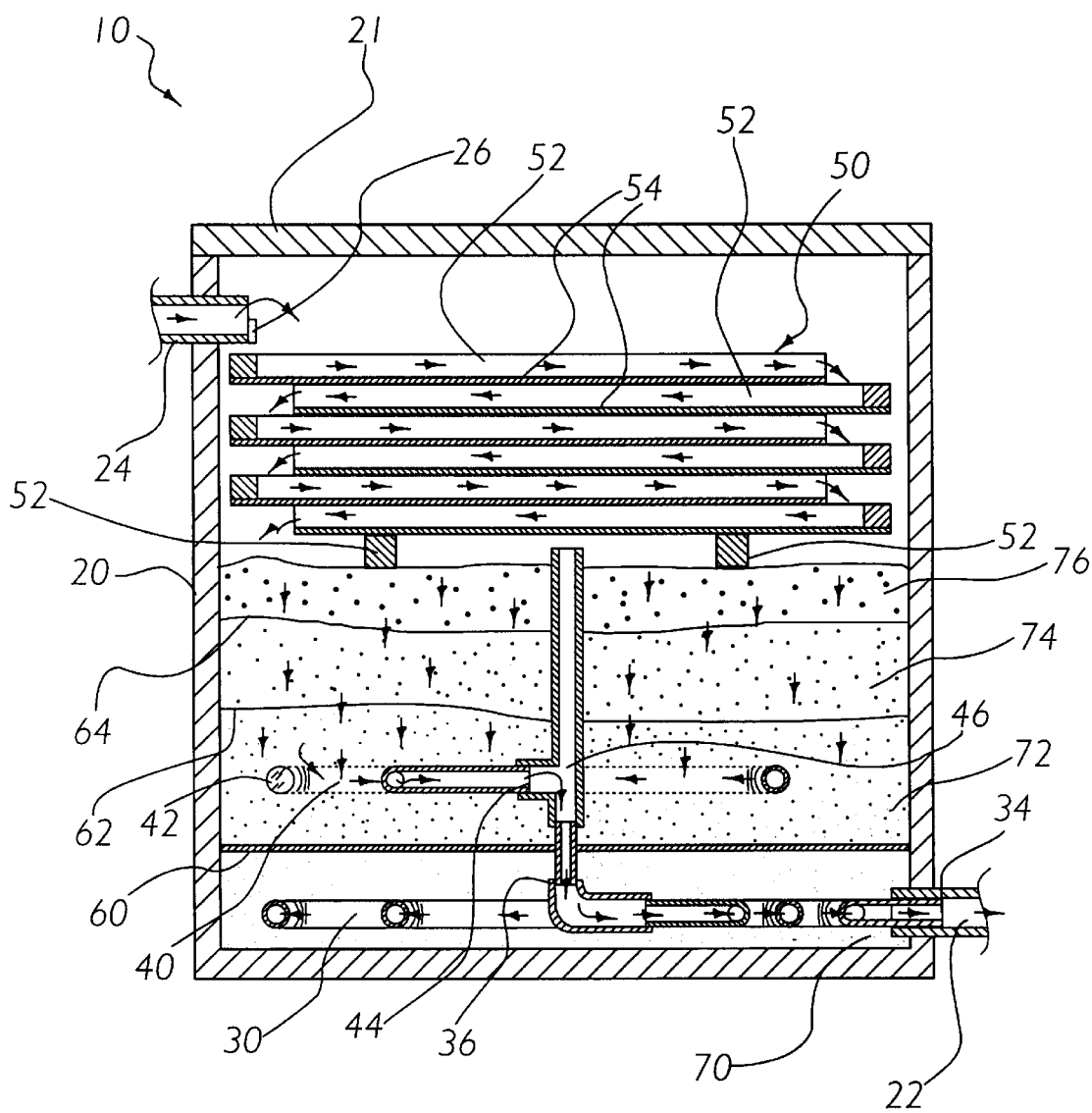
FIG. 2 is a side cutaway view of the present invention disclosing the multiple stages of filtration of the sewage material.

As shown in FIGS. 1 through 4, an outlet tube 22 projects through a lower portion of the tank 20. An output end 34 of a first tube 30 is connected to the outlet tube 22 as shown in FIGS. 1 and 2. The first tube 30 is preferably impermeable to water. The first tube 30 is laid upon the floor of the tank 20 as best shown in FIG. 1 in a coil shape.

The center portion of the first tube 30 is preferably approximately .25 inches higher than the output end 34 of the first tube 30. The slope of the first tube 30 thereby angles slightly from an input end 32 of the first tube 30 toward the output end 34 of the first tube 30. This slight slope of the first tube 30 insures that the filtered liquid flows out through the outlet tube 22 away from the tank 20. An elbow member 36 is attached to the input end 32 of the first tube 30 as best shown in FIG. 2 of the drawings. Bags of sand are placed upon the first tube 30 after properly positioned and a particulate material, such as a first sand layer 70, is placed about the first tube 30 to prevent movement of the first tube 30 during use.

An impermeable plastic sheet 60 is placed over the first tube 30 as shown in FIG. 2 of the drawings to prevent seepage of liquefied sewage material. A second tube 40 having a first end 42 and a second end 44 is placed upon the impermeable plastic sheet 60 as shown in FIGS. 1 and 2. The second tube 40 has a coiled shape similar to the first tube 30 as best shown in FIG. 4. The second tube 40 is permeable to fluids wherein the second end 44 of the second tube 40 is enclosed with a permeable material. A T-member 46 is connected to the first end 42 of the second tube 40 and to the elbow member 36. A course particulate material, such as a first gravel layer 72, is placed about the second tube 40 as shown in FIG. 2. The course texture of the first gravel layer 72 provides easy flowage of liquefied sewage material into the second tube 40. As further shown in FIG. 2 of the drawings, a permeable sheet 62, such as wire mesh 62 is laid upon the upper surface of the first gravel layer 72.

A second sand layer 74 is placed upon the wire mesh 62 as shown in FIG. 2 of the drawings. A cloth sheet 64 is then placed upon the upper surface of the second sand layer 74. As shown in FIG. 2, a third sand layer 76 is placed upon the cloth sheet 64. The wire mesh 62 and the cloth sheet 64 prevent contamination of the layers 72, 74. In addition, the second sand layer 74 and the third sand layer 76 may have different coarseness and permeability to increase the efficiency of the filtering process.

Figure 3:
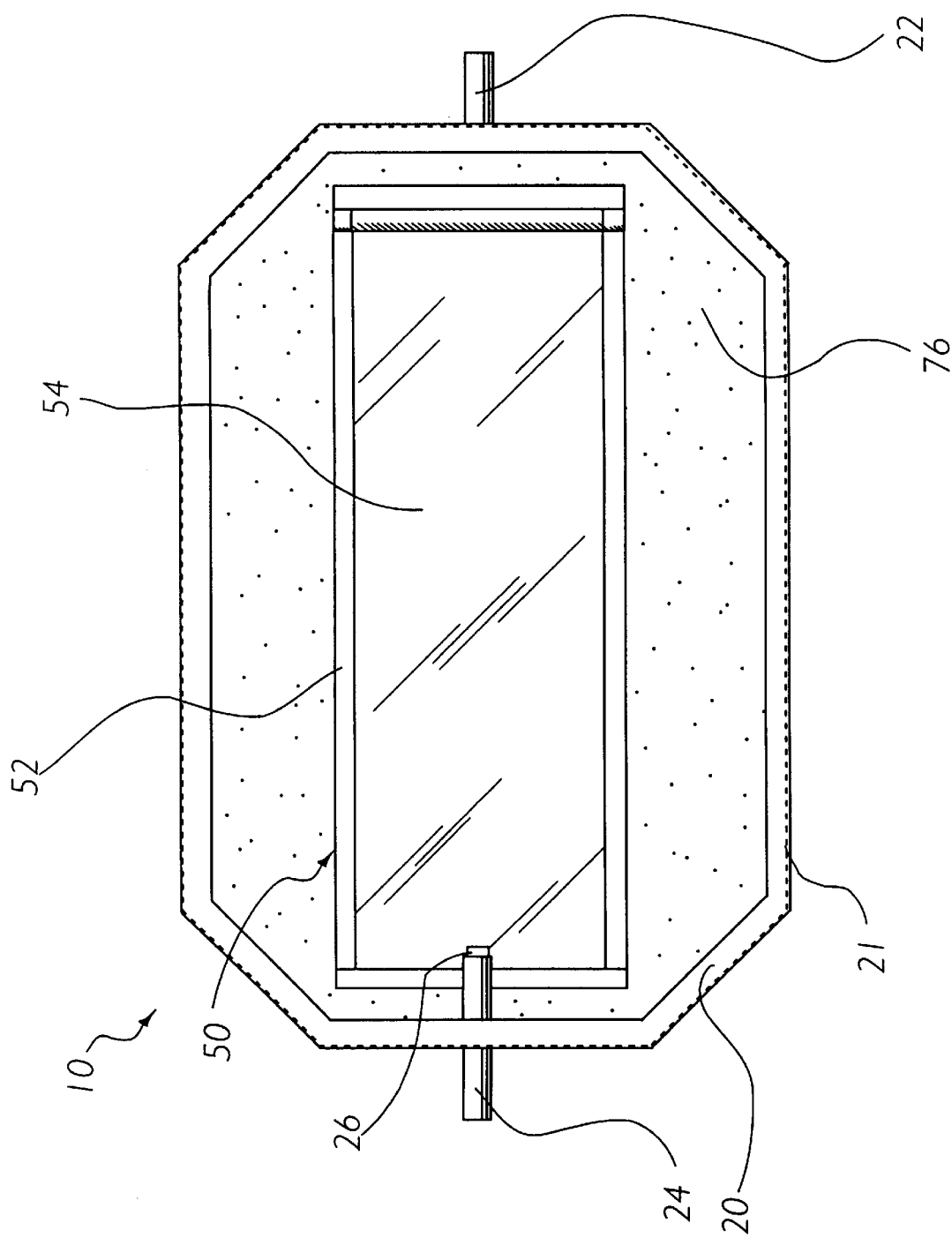
FIG. 3 is a top view with the cover removed from the tank.

As best shown in FIGS. 1, 3 and 4, a layered filter structure 50 is positioned upon the third sand layer 76 and directly below the inlet tube 24 for receiving the liquefied sewage material. The layered filter structure 50 comprises a plurality of staggered layers that have a frame 52 and a filter sheet 54. The filter sheet 54 may be comprised of paper, cloth, or synthetic material. The filter sheet 54 is porous to allow filtration of the liquefied sewage material there through. The upper filter sheets 54 are preferably more porous than the lower filter sheets 54 thereby filtering smaller and smaller particles as the liquefied sewage material filters downwardly from the top. Each filter sheet 54 may have slits within to allow the passage of liquid there through.

An unnumbered overflow pipe may be fluidly connected to the first tube 30 and extend upwardly through the third sand layer 76 to receive any excess liquefied sewage material during high volume flowage. In addition, a chlorination line may also be connected to the T-member 46 for allowing chlorine into the filtered liquid before discharge from the outlet tube 22.

In use, the sewage material from a house in collected within a conventional septic tank. The partially decomposed sewage material then flows into a sewer pipe system along with sewage material from other housings or buildings into a first two-compartment septic tank. The sewage material then flows into a second two-compartment septic tank where it is further aerated and decomposed. The sewage material by this time is liquefied and exits the second two-compartment septic tank into the inlet tube 24. The liquefied sewage material is slowly disbursed through the drain apertures 28 within the plug 26 attached to the inlet tube 24 onto the upper filter sheet 54 of the layered filter structure 50. The liquefied sewage material then filters through the layered filter structure 50 until it is dispersed onto the third sand layer 76.

The liquefied sewage material filters through the third sand layer 76 and then through the second sand layer 74 whereafter it penetrates the wire mesh 62 into the first gravel layer 72 surrounding the second tube 40. The filtered liquid then seeps into the permeable second tube 40 whereafter it is channeled to the T-member 46. The filtered liquid then enters the first tube 30 and slowly follows the path of the first tube 30 allowing increased aeration of the filtered liquid. The filtered liquid is then emitted through the outlet tube 22 into any desired location of the user. The above process continues until the user desires to change the filter sheets 54 within the layered filter structure 50 or the layers of sand 74, 76.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A sewage filtration system, comprising:
   a tank having an inlet tube and an outlet tube, wherein said inlet tube is connectable to an outlet line of a conventional septic tank;
   a first tube having an output end and an input end, wherein said output end is fluidly connected to said outlet tube;
   a second tube positioned above said first tube and fluidly connected to said input end of said first tube, wherein said second tube is permeable;
   at least one layer of filtering particulate material above said first tube for filtering liquefied sewage inputted through said inlet tube, wherein said at least one layer of filtering particulate material surrounds said second tube;
   a layered filter structure positioned upon said at least one layer; and
   wherein said layered filter structure comprises:
      a plurality of staggered frames; and
      a corresponding plurality of filter sheets attached to each of said plurality of staggered frames for filtering liquefied sewage, wherein said filter sheets are porous.

2. The sewage filtration system of claim 1, wherein an upper portion of said plurality of filter sheets are more porous than a lower portion of said filter sheets.

3. The sewage filtration system of claim 1, wherein said at least one layer comprises a plurality of particulate layers.

4. The sewage filtration system of claim 3, wherein said particulate layers have different coarseness.

5. The sewage filtration system of claim 4, wherein each of said particulate layers are separated by a separation sheet to prevent mixing.

6. The sewage filtration system of claim 5, wherein said separation sheet is a wire mesh.

7. The sewage filtration system of claim 5, wherein said separation sheet is a cloth material.

8. The sewage filtration system of claim 1, wherein said first tube is impermeable.

9. A sewage filtration system, comprising:
   a tank having an inlet tube, an outlet tube and a removable cover, wherein said inlet tube is connectable to an outlet line of a conventional septic tank;
   a cap attached to said inlet tube covering a portion of said inlet tube for slowing a flow of liquefied sewage;
   a first tube having an output end and an input end, wherein said output end is fluidly connected to said outlet tube;
   a second tube positioned above said first tube and fluidly connected to said input end of said first tube, wherein said second tube is permeable;
   at least one layer of filtering particulate material above said first tube for filtering liquefied sewage inputted through said inlet tube, wherein said at least one layer of filtering particulate material is positioned about said second tube; a layered filter structure positioned upon said at least one layer;
   wherein said layered filter structure comprises:
      a plurality of staggered frames; and
      a corresponding plurality of filter sheets attached to each of said plurality of staggered frames for filtering liquefied sewage, wherein said filter sheets are porous.

10. The sewage filtration system of claim 9, wherein an upper portion of said plurality of filter sheets are more porous than a lower portion of said filter sheets.

11. The sewage filtration system of claim 10, wherein said at least one layer comprises a plurality of particulate layers.

12. The sewage filtration system of claim 11, wherein said particulate layers have different coarseness.

13. The sewage filtration system of claim 12, wherein each of said particulate layers are separated by a dividing sheet to prevent mixing.

14. The sewage filtration system of claim 13, including a chlorination line fluidly connected to said first tube for allowing chlorination of filtered liquid prior to being discharged from said outlet tube.

15. The sewage filtration system of claim 14, wherein said separation sheet is a wire mesh.

16. The sewage filtration system of claim 15, wherein said cap includes at least one drain aperture within a lower portion.

* * * * *